United States Patent
Reddy (10) Patent No.: US 11,384,629 B2
(45) Date of Patent: Jul. 12, 2022

(54) SYSTEMS AND METHODS FOR DRIVING A PUMP USING AN ELECTRIC MOTOR

(71) Applicant: Caterpillar Inc., Peoria, IL (US)

(72) Inventor: Suresh Baddam Reddy, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/931,033

(22) Filed: Jul. 16, 2020

(65) Prior Publication Data

US 2022/0018234 A1 Jan. 20, 2022

(51) Int. Cl.
| | |
|---|---|
| *E21B 43/26* | (2006.01) |
| *F16H 3/089* | (2006.01) |
| *F04B 17/03* | (2006.01) |
| *E21B 43/12* | (2006.01) |

(52) U.S. Cl.
CPC ......... *E21B 43/2605* (2020.05); *F16H 3/089* (2013.01); *E21B 43/12* (2013.01); *F04B 17/03* (2013.01)

(58) Field of Classification Search
CPC .. E21B 43/2605; E21B 43/26; E21B 43/2607; E21B 43/12; F16H 3/089; F04B 17/03
See application file for complete search history.

(56) References Cited

U.S. PATENT DOCUMENTS

| | | | | |
|---|---|---|---|---|
| 5,422,550 | A * | 6/1995 | McClanahan | H02P 5/50 318/103 |
| 9,395,049 | B2 * | 7/2016 | Vicknair | F17D 1/08 |
| 10,227,854 | B2 | 3/2019 | Glass | |
| 2007/0277982 | A1 * | 12/2007 | Shampine | E21B 43/16 166/308.1 |
| 2014/0096974 | A1 * | 4/2014 | Coli | E21B 43/26 166/358 |
| 2018/0363437 | A1 | 12/2018 | Goli et al. | |
| 2018/0363640 | A1 * | 12/2018 | Kajita | E21B 44/00 |

FOREIGN PATENT DOCUMENTS

| | | | | |
|---|---|---|---|---|
| WO | WO-2018044307 A1 * | 3/2018 | | F04B 15/02 |
| WO | WO-2019204323 A1 * | 10/2019 | | F04B 17/06 |
| WO | WO-2020214934 A1 * | 10/2020 | | F04D 13/12 |
| WO | WO-2020240580 A1 * | 12/2020 | | F04B 49/06 |

\* cited by examiner

*Primary Examiner* — James G Sayre
(74) *Attorney, Agent, or Firm* — Lee & Hayes, PLLC (57) ABSTRACT

A system for driving a hydraulic fracturing pump includes an electric motor having a drive shaft configured to rotate at a constant speed and a power source electrically connected to the electric motor. The system also includes a motor controller operably connected to the electric motor via a relay, wherein the motor controller is operably connected to the electric motor by the relay to start the electric motor, and is operably disconnected from the electric motor by the relay once the drive shaft reaches the constant speed. The system further includes a pump coupled to the drive shaft via a transmission, wherein the transmission is configured to transfer rotational energy from the drive shaft to the pump via an output shaft of the transmission, the output shaft of the transmission being configured to drive the pump at varying speeds while the drive shaft rotates at the constant speed.

20 Claims, 6 Drawing Sheets

SYSTEMS AND METHODS FOR DRIVING A PUMP USING AN ELECTRIC MOTOR

TECHNICAL FIELD

The present disclosure relates to a pump system. More specifically, the present disclosure relates to a hydraulic fracturing system including an electric motor that drives a hydraulic fracturing pump via a transmission.

BACKGROUND

Hydraulic fracturing is a well stimulation technique that typically involves pumping hydraulic fracturing fluid into a wellbore at a specific rate and pressure necessary to form factures in a rock formation surrounding a targeted region of the wellbore. This well stimulation technique often enhances the natural fracturing of a rock formation in order to increase the permeability of the rock formation, thereby improving recovery of oil, natural gas, and/or other fluids. For example, such techniques are also performed to enhance recovery of water in water wells.

In order to fracture such rock formations, the hydraulic fracturing fluid is injected into the wellbore at high pressures. Typically, a series of pumps are used to achieve such high-pressure injection of the hydraulic fracturing fluid. The series of pumps may be powered by diesel engines, often with a single diesel engine dedicated to a single pump. However, driving the series of pumps by diesel engines (or dynamic gas blending engines) may include drawbacks. For example, such drawbacks include fuel costs associated with powering the diesel engines, emissions from the engines, noise produced by the engines, load factor limitations on the engines, the number of fracturing trailers required to provide adequate pump pressure to a manifold, etc. As such, some hydraulic fracturing systems provide electric (either full electric or hybrid) motor drive systems to power the series of hydraulic fracturing pumps. However, electric systems often require expensive and bulky transformers. Electric systems also require power electronics to control and/or convert electric power received from a power source, such as gas turbine generator sets.

An example hydraulic fracturing system having an electric motor is described in U.S. Pat. No. 10,227,854 (hereinafter referred to as the '854 reference). In particular, the '854 reference describes a pumping system that is self-contained on a trailer. For example, the '854 reference describes a trailer unit having two pumps that are powered by two induction motors. The '854 reference describes that the two induction motors are powered by a diesel generator located on the trailer. The trailer unit described in the '854 reference further includes two variable frequency drives (VFD) that are configured to control speed and torque of the induction motors by varying the frequency and voltage input of the induction motors. For instance, the system described in the '854 reference utilizes a respective VFD to control each induction motor included in the system. However, due to this configuration, the system described in the '854 reference may be more costly than other systems since the system requires a dedicated VFD for each motor.

Example embodiments of the present disclosure are directed toward overcoming the deficiencies described above, among others.

SUMMARY

An example system for driving a hydraulic fracturing pump includes an electric motor having a drive shaft configured to rotate at a constant speed and a power source electrically connected to the electric motor. The system also includes a motor controller operably connected to the electric motor via a relay, wherein the motor controller is operably connected to the electric motor by the relay to start the electric motor, and is operably disconnected from the electric motor by the relay once the drive shaft reaches the constant speed. The system further includes a pump coupled to the drive shaft via a transmission, wherein the transmission is configured to transfer rotational energy from the drive shaft to the pump via an output shaft of the transmission, the output shaft of the transmission being configured to drive the pump at varying speeds while the drive shaft rotates at the constant speed.

In another example, an electric drive system includes an electrical power source and an electric motor electrically connected to the power source and configured to operate at a same voltage as the electrical power source, the electric motor having a drive shaft configured to rotate at a constant speed. The electric drive system further includes a pump coupled to the drive shaft of the electric motor via a transmission, wherein a gear ratio or a speed ratio of the transmission is selected to adjust at least one of a flow rate or a pump pressure of the pump.

In a further example, a method of driving a pump includes receiving, via a controller, instructions to start an electric motor and starting, via a variable frequency drive and a power source, an electric motor, wherein the variable frequency drive controls a frequency and a voltage of power that is supplied to the electric motor until a frequency of the electric motor is synchronized with a frequency of power that is supplied by the power source. The method also includes receiving, from one or more sensors and by the controller, engine speed data indicative of an engine speed of the electric motor, determining, via the controller, that the engine speed has reached the predetermined speed, and bypassing, via the controller and a relay, the variable frequency drive based at least in part on determining that the engine speed has reached the predetermined speed, wherein bypassing the variable frequency drive includes electrically connecting the electric motor directly to the power source.

DETAILED DESCRIPTION

Figure 1:
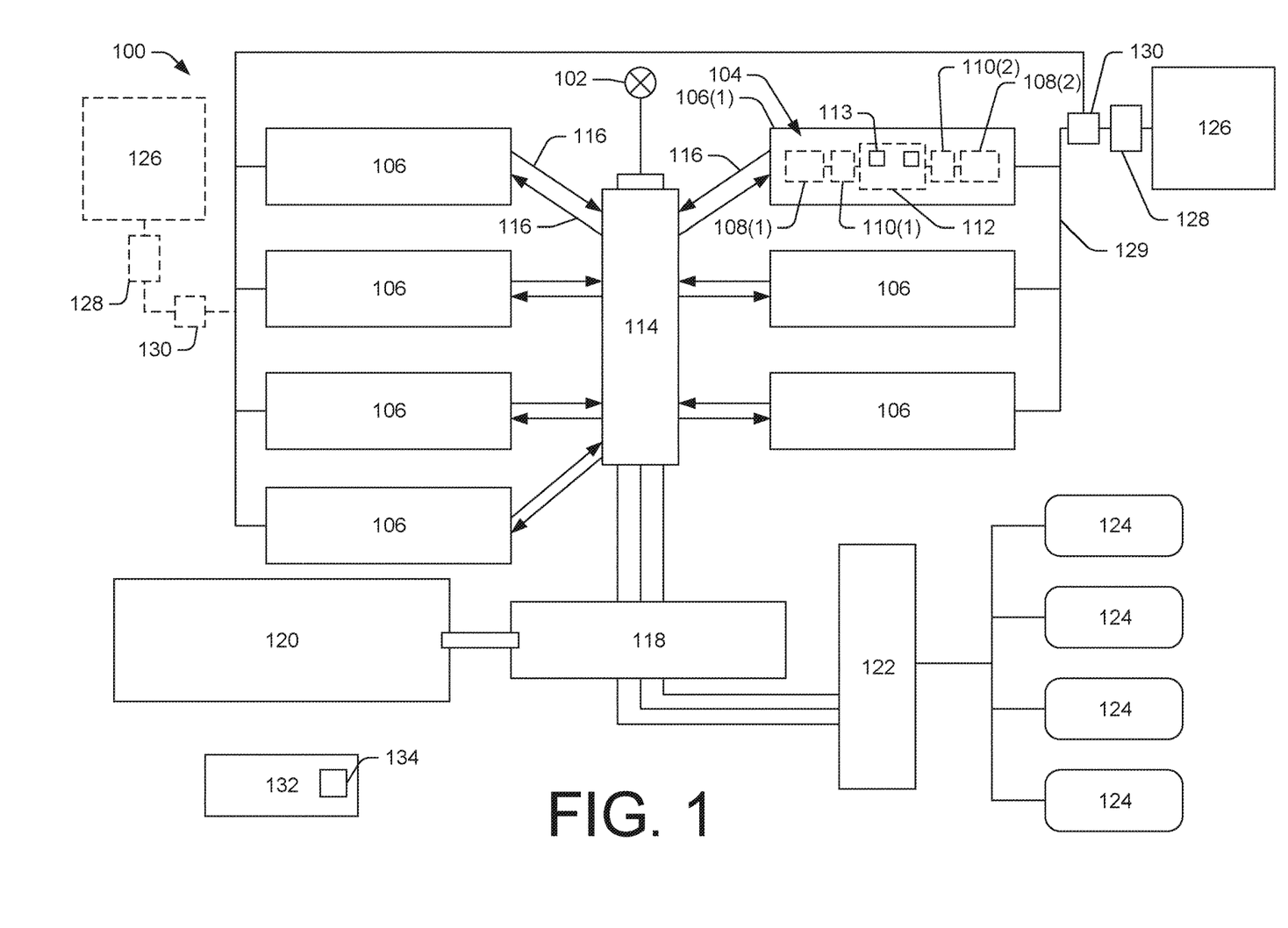
FIG. 1 is a schematic illustration of a hydraulic fracturing system in accordance with an example of the present disclosure.

Wherever possible, the same reference numbers will be used throughout the drawings to refer to the same or like parts. FIG. 1 depicts an example hydraulic fracturing system 100. For example, FIG. 1 depicts a plan view of an example hydraulic fracturing site along with equipment that is used during a hydraulic fracturing process. While FIG. 1 depicts example equipment that is used during hydraulic fracturing, it is to be understood that additional equipment may be implemented to conduct the hydraulic fracturing process. Furthermore, certain equipment shown in FIG. 1 may be omitted in some hydraulic fracturing systems.

As mentioned previously, hydraulic fracturing is a well stimulation technique that requires high-pressure injection of fracturing fluid to be injected into a well 102 and corresponding wellbore in order to hydraulically fracture a rock formation surrounding the wellbore. While the description provided herein describes hydraulic fracturing in the context of wellbore stimulation for oil and gas production, it is to be understood that other uses of hydraulic fracturing are contemplated herein. For example, the hydraulic fracturing system 100 described herein may be used to stimulate groundwater wells, to dispose of waste by injection, to measure stress in the ground, to precondition and/or induce cave-ins for mining, to improve electrical generation in geothermal systems, etc.

High-pressure injection of the fracturing fluid is typically achieved by a series of pump systems 104 that are often mounted (or housed) on a series of trailers 106. FIG. 1 shows a first trailer 106(1) having a pump system 104 (described further herein below with respect to FIGS. 2-4). The pump system 104 is shown in broken lines as the configuration of the pump system 104 may vary as shown and described below with respect to FIGS. 2-4. It is to be understood that each of the trailers 106 may include similar pump systems in same or different configurations as the first trailer 106(1). The first trailer 106(1) depicts an example pump system 104 having an electric motor 112 that is connected to a first pump 108(1) and a second pump 108(2) (collectively, "the pumps 108") via a first transmission 110(1) and a second transmission 110(2) (collectively, "the transmissions 110"), respectively. In some examples, the pump system 104 includes at least one pump, at least one transmission, and at least one electric motor, among other components. The hydraulic fracturing system 100 may include any number of trailers 106 having pumps thereon in order to pump hydraulic fracturing fluid at a predetermined rate and pressure. The exact configuration of each trailer 106 may vary from trailer to trailer and/or may vary from site to site.

In some examples, the electric motor 112 includes a constant speed (or dual speed) electric motor 112. For example, the electric motor 112 may be configured to operate at a constant speed once the electric motor 112 has been started and synchronized with a power source (described further herein below). Thus, the electric motor 112 may operate at a constant speed whether the electric motor 112 is connected and/or controlled by a motor controller or not. In some examples, the transmissions 110 are configured to receive a drive shaft of the electric motor 112 rotating at a first speed and may transfer rotational energy to an output shaft of the transmission 110 that rotates at a second speed. In some examples and based on a gear ratio (or speed ratio) of the transmissions 110, the second speed may be different than the first speed. However, in some examples, the gear ratio (or speed ratio) of the transmissions 110 may be configured to transfer rotational energy from a drive shaft of the electric motor 112 to an output shaft of the transmission 110 at a substantially similar (or same) rotational speed. In some examples, the transmissions 110 may be configured as one of various types of transmissions. For example, the transmissions 110 may include continuously variable transmissions (CVT), hydraulic parallel path transmissions having variators, geared transmissions, hydro-mechanical transmissions, or any other type of transmission. In some examples, the transmissions 110 may include a variator that controls output speed of the transmission 110.

In some examples, the pumps 108 may be in fluid communication with a manifold 114 via various flow lines 116 such as pipes or other types of conduit. The manifold 114 combines fracturing fluid received from the pumps 108 prior to injecting the fracturing fluid into the well 102. The manifold 114 may also distribute fracturing fluid to the pumps 108 that the manifold 114 receives from a blender 118. However, in some examples, the hydraulic fracturing system 100 may provide fracturing fluid to the pumps 108 via additional fluid supply lines or a fluid supply manifold. The pumps 108 may be configured as any type of fluid pumps. For example, the pumps 108 may be configured as various types of well service pumps that pump fluid into a wellbore of the well 102. Furthermore, the pumps 108 may be configured as various types of high-volume hydraulic fracturing pumps such as triplex or quintuplex pumps. Additionally, and/or alternatively, the pumps 108 may be configured as other types of reciprocating positive-displacement pumps or gear pumps. The pumps 108 required and corresponding designs thereof may vary depending on the fracture gradient of the rock formation that will be hydraulically fractured, the number of pumps 108 used in a hydraulic fracturing system 100, the flow rate necessary to complete the hydraulic fracture, the pressure necessary to complete the hydraulic fracture, etc.

In some examples, a controller (described further herein) may determine a flow rate and/or a pressure required at the pumps 108 during a hydraulic fracturing process and may change the output speed of the pumps 108 by adjusting the gear ratio or other parameters of the transmissions 110 in order to provide the necessary flow rate and pressure at the pumps 108. In an example where the electric motor 112 includes a dual speed electric motor, the controller may switch the electric motor 112 between a first speed and a second speed, while also adjusting a gear ratio of the transmissions 110. Thereby, the controller may provide finer control of the speed and power output of the transmissions 110 by switching the electric motor 112 between a first speed and a second speed. Furthermore, by such a process, the controller may provide finer adjustments of flow rate and pressure at the pumps 108.

In some examples, the various fluids are transferred between the various components of the hydraulic fracturing system via the flow lines 116. The blender 118 combines proppant received from a proppant storage unit 120 with fluid received from a hydration unit 122. In some examples, the proppant storage unit 120 may include a dump truck, a truck with a trailer, a silo or series of silos, or other type of containers. The hydration unit 122 may receive water from one or more water tanks 124. In some examples the hydraulic fracturing system 100 may receive water from water pits, water trucks, water lines, and/or any other suitable water source of water. The hydration unit 122 adds fluid additives to the water such as polymers or other chemical additives. Such additives may increase the viscosity of the fracturing fluid prior to mixing the fluid with proppant in the blender 118. The hydration unit 122 also mixes additives into the fracturing fluid such that the fracturing fluid includes an appropriate pH for injection into a targeted formation surrounding the wellbore. The fluid additives may be stored in the hydration unit 122. Additionally, and/or alternatively, the hydration unit 122 may be in fluid communication with one or more fluid additive storage units (not shown) that store fluid additives that are added to the fracturing fluid via the hydration unit 122. The hydration unit 122 may include a series of tanks, pumps, gates, etc.

The hydraulic fracturing system 100 may further include one or more power sources 126. The power sources 126 may be electronically connected to the electric motors 112 located on the trailers 106. The power sources 126 may include one or more of gas turbine generator sets, reciprocating gas engine generator sets, dynamic gas blending engine generator sets, diesel generator sets, a power grid, or any other type of electrical power source. The power sources 126 may provide electrical power to the electric motors 112 at a relatively high voltage. For example, the power sources 126 may provide electrical power to the electric motors 112 at approximately 13.8 kV. Such a voltage represents just one example and in other examples, the voltage supplied by the power sources 126 to the electric motors 112 may be higher or lower. Furthermore, in some examples, the power sources 126 may provide electrical power to the electric motors 112 without using transformers since the electric motors 112 may be configured to operate at a constant speed and/or at a high voltage. In some examples, each trailer 106 may include a dedicated power source. Alternatively, the hydraulic fracturing system 100 may include a number of power sources 126 that is less than the number of trailers 106. For example, the hydraulic fracturing system 100 may include one, two, or three power sources 126 that power a plurality of trailers 106 and respective pump systems 104. Still further, a single power source may be configured to power a pair of trailers 126.

In some examples, the hydraulic fracturing system 100 further includes one or more motor controllers (e.g., a starter) 128 electrically connected to a power source 126 and the electric motors 112 via wiring 129 and a relay 130. The motor controller 128 may include a soft starter, self-starter, variable frequency drive (VFD), or other type of motor controller. In some examples, the motor controller 128 includes a soft starter that includes thyristors for controlling a voltage supplied to the electric motor 112. The soft starter may control the voltage until the electric motor 112 reaches a predetermined speed (e.g., constant speed). The soft starter is configured to increase and decrease motor speed gradually. Additionally, and/or alternatively, the motor controller 128 includes a VFD which includes a rectifier and inverter to control motor voltage and frequency to vary the motor speed of the electric motor 112.

The motor controller 128 may be disposed on a trailer 106 (or trailers) or may be located remote from the trailer 106. In some examples, the number of motor controllers 128 included in the hydraulic fracturing system 100 may be equal to the number of power sources 126. Additionally, and/or alternatively, the number of motor controllers 128 included in the hydraulic fracturing system 100 may be less than the number of power sources 126. For example, each trailer 106 may include a dedicated power source 126 and a motor controller 128 may be electrically connected to multiple power sources 126 via a relay 130. The motor controller 128 may be configured to start an electric motor 112 by varying a frequency and voltage that the motor controller 128 supplies to the electric motor 112 from the power source 126. In some examples, the motor controller 128 increases motor speed of the electric motor 112 by controlling the frequency and voltage supplied to the electric motor 112 until the electric motor 112 reaches a predetermined speed. Once the frequency of the electric motor 112 is synchronized with the frequency of the power source 126, the motor controller 128 may be bypassed via the relay 130 and the electric motor 112 may operate at a constant speed.

In some examples, the motor controller 128 is electrically connected to a plurality of electric motors via the relay 130 and may be configured start electric motors individually. The relay 130 includes an electrically operated switch that closes or opens various circuits (or contacts), thereby electrically connecting or disconnecting one or more electric motors 112 from the motor controller 128. Furthermore, when a relay 130 is operated to disconnect an electric motor 112 from the motor controller 128, the relay 130 may connect the electric motor 112 directly to a power source 126, thereby bypassing the motor controller 128. Additionally, and/or alternatively, the hydraulic fracturing system 100 may include multiple relays and/or a series of relays that connect and disconnect the electric motors 112 to and from the motor controller 128 and/or the power source 126. The relay 130 may be controlled by a controller 132, which will be described further herein. In some examples, each electric motor 112 may be electrically connected to a relay that connects or disconnects the electric motor 112 from the motor controller 128 and connects or disconnects the electric motor 112 from the power source 126. Alternatively, the hydraulic fracturing system 100 may include a number of relays that is less than the number of electric motors 112 and a single relay may be electrically connected to multiple electric motors 112.

Once an individual electric motor is started and reaches a predetermined speed, the motor controller 128 is bypassed and may be connected to another electric motor via the relay 130 in order to start the other electric motor. For example, the electric motor 112 may include one or more sensors 113 that sense and generate motor speed data. The motor speed data may be sent to a controller 132 and the controller 132 may control the contacts of the relay 130. The one or more sensors 113 of the electric motor 112 may also sense and generate voltage data and/or frequency data indicating a voltage and/or frequency at which the electric motor 112 is operating. Additionally, and/or alternatively, the motor controller 128 may be communicatively coupled to a controller 132 and may provide frequency data and/or voltage data to the controller 132. The controller 132 may determine when to bypass the motor controller 128 based on the frequency data and/or the voltage data. In some examples, the motor controllers 128 may include line starters or other electronic control devices. As mentioned previously, the hydraulic fracturing system 100 may include a soft starter, a self-starter, a direct on line starter, or other type of power electronics configured to control the startup of the electric motors 112. The starters may also be bypassed once the electric motor 112 of a pump system 104 is started and synchronized. However, in some examples, each pump system 104 may include a dedicated motor controller (such as a starter or VFD) configured to provide electrical current to the electric motors 112.

The hydraulic fracturing system 100 also includes a data monitoring van 134 or other type of control system. In some examples, the control system may be entirely or partially remote from a hydraulic fracturing site. Additionally, and/or alternatively, the hydraulic fracturing process and/or portions thereof may be automated. For example, the data monitoring van 134 may include one or more controllers 132. The one or more controllers 132 are configured to control at least a portion of the operations of the hydraulic fracturing system 100 automatically and/or with user input. In some examples, the hydraulic fracturing system 100 may include various controllers 132 that control the various components of the hydraulic fracturing system 100. For example, the hydraulic fracturing system 100 may include a controller 132 that controls the operation of the pump system 104 and/or the components thereof. One example may include a controller 132 that controls a gear ratio, output speed, or other parameters of the transmissions 110 in order to provide the speed and torque necessary for the pumps 108 to pump hydraulic fracturing fluid at a specific flow rate and/or pressure. While the description herein may describe a single controller 132, it is to be understood that multiple controllers 132 may be used to perform the actions described herein. The data monitoring van 134 may include a variety of monitoring equipment that is communicatively connected to the various pumps 108, electric motors 112, transmissions 110, power sources 126, motor controllers 128, and other components of the hydraulic fracturing system 100. The data monitoring van 134 may also provide controls to a user that enables a user to control the processes of the hydraulic fracturing system 100 described herein. Such control may be provided via the controller 132 having a user interface or other control methods. The hydraulic fracturing system 100 may include a plurality of sensors included in each of the components described above that provide data to the data monitoring van 134 and the controller 132 in order to allow the controller 132 and/or users to control the process of hydraulic fracturing.

The controller 132 may be, for example, a hardware electronic control module (ECM) or other electronic control unit (ECU). The controller 132 includes, for example, a microcontroller, memory (e.g., RAM), storage (e.g., EEPROM or Flash) configured to perform the described functions of the controller 132. The controller 132 controls at least a portion of the operations of the hydraulic fracturing system system 100 including the pump system 104 automatically and/or with user input. Instead of, or in addition to, an ECM/ECU the controller 132 may include a general computer microprocessor configured to execute computer program instructions (e.g., an application) stored in memory to perform the disclosed functions of the controller 132. As mentioned, the controller 132 includes a memory, a secondary storage device, processor(s), and/or any other computing components for running an application. Various other circuits may be associated with controller 132 such as power supply circuitry, signal conditioning circuitry, or solenoid driver circuitry. In some examples, the controller 132 and/or a portion of components of the controller 132 may be located in the data monitoring van 134 and/or remotely from the hydraulic fracturing system 100 and may be communicatively coupled to the hydraulic fracturing system 100. As mentioned previously, the controller 132 may receive various types of data from components of the hydraulic fracturing system 100. Furthermore, the controller 132 may provide instructions to the various components of the hydraulic fracturing system 100. For example, the controller 132 may receive motor speed data from a speed sensor 113 of the electric motor 112. Additionally, and/or alternatively, the controller 132 may receive frequency data and/or voltage data from a VFD 128 (or other motor controller), from a power source, and/or from an electric motor 112.

Figure 2:
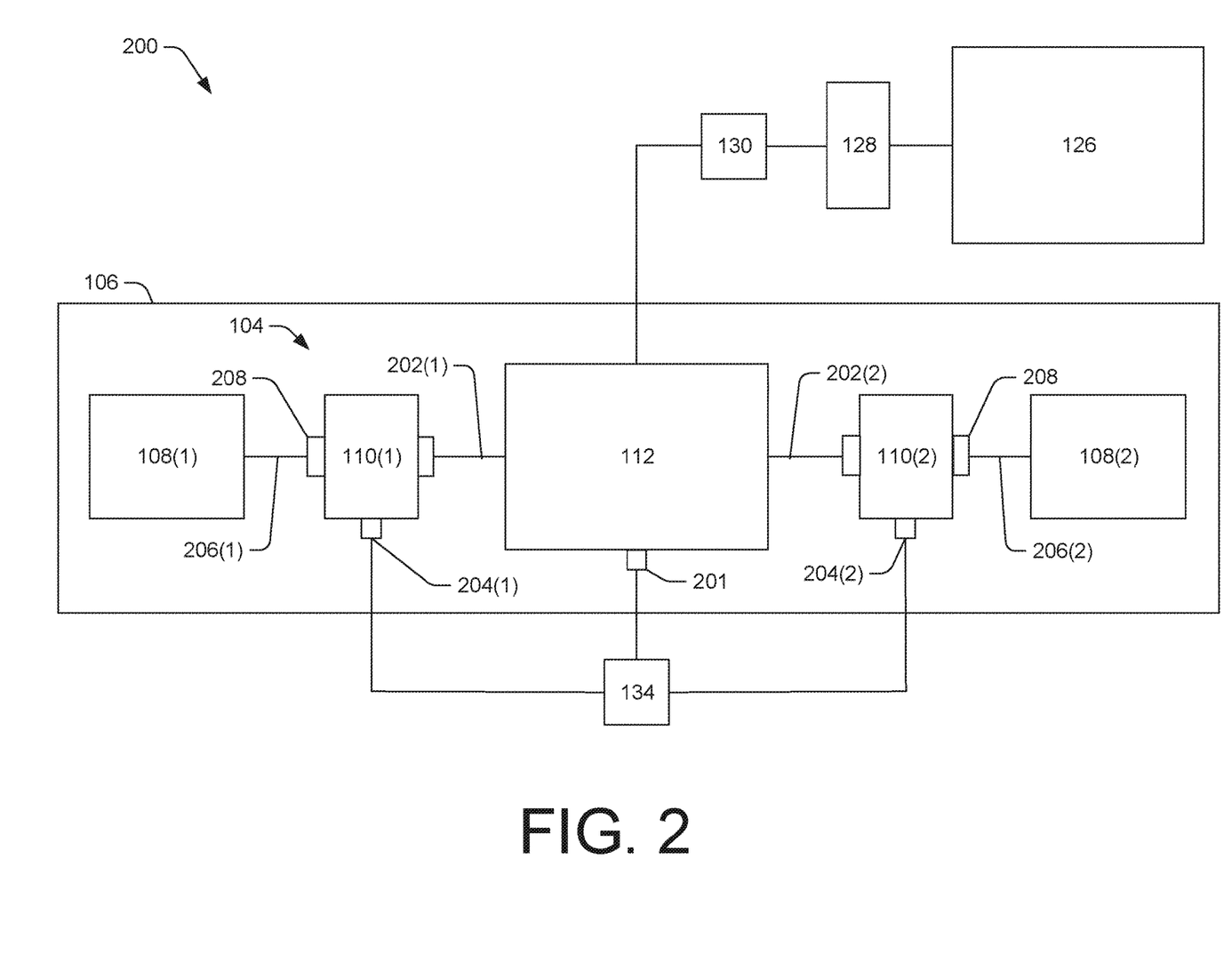
FIG. 2 is a schematic illustration of a first configuration of a fluid pump system in accordance with an example of the present disclosure.

FIG. 2 depicts a schematic illustration of a first configuration 200 of a pump system 104. The pump system 104 includes an electric motor 112, as mentioned above. In some examples, the electric motor 112 is configured as a constant speed electric motor. Thus, in some examples, as a load imparted on the electric motor 112 changes, the power source 126 may vary the amount of power supplied to the electric motor 112 in order to maintain a constant speed of the electric motor 112. For example, the power source 126 may include one or more generators (such as diesel generator sets, turbine generators, or other type of generators). As mentioned previously, the electric motor 112 may include one or more sensors 113. The one or more sensors 113 may communicate load data, engine speed data, or other types of data to the one or more generators. Based on the data received from the one or more sensors 113 of the electric motor 112, the one or more generators may be configured to increase or decrease an amount of power that the one or more generators generate and provide to the electric motor 112. Additionally, and/or alternatively, if the power source 126 includes an electrical grid, the electric motor 112 may draw an amount of power from the electrical grid in order to maintain a constant speed of the electric motor 112.

The electric motor 112 may be configured to operate at a relatively high voltage. For example, the electric motor 112 may be configured to operate at approximately 13.8 kV. However, the voltage supplied to the electric motor 112 by the power source 126 may vary, as mentioned previously. In some examples, the electric motor 112 includes a 60 Hz electric motor configured to operate at approximately 1800 revolutions per minute (RPM). However, the type and/or speed of electric motor 112 may vary depending on the application, configuration, and/or requirements of the electric motor 112. As mentioned previously, the electric motor 112 is configured to operate at a constant speed regardless of whether the electric motor 112 is connected to and/or controlled by a motor controller. Furthermore, the electric motor 112 may include a dual speed electric motor that is configured to operate at a first constant speed or a second constant speed. The controller 132 (or a dedicated electric motor controller) may adjust a constant speed of a dual speed electric motor by altering the number of poles used to drive the electric motor 112 by altering wiring connections inside the electric motor via a switch or other device. For example, the electric motor 112 may include a dual speed electric motor such as a 60 Hz electric motor configured to operate at 1800 RPM or 900 RPM. The electric motor 112 may include a motor speed sensor 201 that is configured to determine a speed at which a drive shaft 202 of the electric motor 112 rotates, and to generate motor speed data representative of the speed of the drive shaft 202. In some examples, the motor speed sensor 201 may provide the motor speed data to the controller 132.

As mentioned above with respect to FIG. 1, the electric motor 112 may be electrically connected to a power source 126. In some examples, a single power source 126 may be electrically coupled to a plurality of electric motors. Alternatively, the power source 126 may be dedicated to a single electric motor 112. The power source 126 may include one or more gas turbine generator sets, reciprocating gas engine generator sets, dynamic gas blending engine generator sets, diesel generator sets, a power grid, or any other type of electrical power source. The power source 126 may provide electrical power to the electric motors 112 at a high voltage. Thus, in some examples, the power sources 126 may provide electrical power to the electric motors 112 without using transformers since the electric motors 112 may be configured to operate at a same (or substantially the same) voltage as the power source 126. In the first configuration 200, the electric motor 112 may be started by a motor controller 128. As mentioned previously, the motor controller 128 may include a VFD. Additionally, and/or alternatively, the pump system 104 shown in FIG. 2 may include another type of motor controller such as a line starter, soft starter, etc. In some examples, if the motor controller 128 is used to start the electric motor 112 and the motor controller 128 may be bypassed via a relay 130 once the frequency of the electric motor 112 is synchronized with the frequency of the power source 126. In some examples, once the electric motor 112 is synchronized, the electric motor 112 may operate at a predetermined speed (e.g., 1800 RPM). As such, the pump system 104 may not require a dedicated motor controller. Rather, the electric motor 112 may operate at a constant speed while connected to the power source 126 and without being connected to a motor controller 128.

In some examples, the electric motor 112 may include a dual shaft electric motor. A dual shaft electric motor refers to an electric motor having a single shaft with an end protruding on both sides of the electric motor 112. For example, and as shown in FIG. 2, the electric motor 112 may include a shaft 202 (such as a drive shaft) having a first end 202(1) coupled to a first transmission 110(1) and a second end 202(2) coupled to a second transmission 110(2). Alternatively, the electric motor 112 may include two separate shafts that extend in opposite directions and that transfer rotational energy to transmissions 110. As mentioned previously, the electric motor 112 may operate at a constant speed once the electric motor 112 has been started and synchronized. As such, the shaft 202 (or shafts) of the electric motor 112 may rotate at a constant speed. In the configuration shown in FIG. 2, the electric motor 112 is configured to provide rotational energy to the first transmission 110(1) and the second transmission 110(2) via the shaft 202.

The first transmission 110(1) and the second transmission 110(2) (collectively "the transmissions 110") are configured to provide speed and torque conversions from the shaft 202 to the first pump 108(1) and the second pump 108(2) (collectively "the pumps 108"). As mentioned previously, the transmissions 110 may include various types of transmissions. For example, the transmissions 110 may include continuously variable transmissions (CVT), hydraulic parallel path transmissions, geared transmissions, hydro-mechanical transmissions, or any other type of transmission. Typical hydraulic fracturing systems having an electric motor are often driven by a dedicated VFD through fixed gearing. However, the pump system 104 described herein may eliminate the need for a dedicated VFD or other motor controller since the electric motor 112 may operate at a constant speed, while the transmissions 110 provide varying speed and torque output for the pumps 108. The transmissions 110 may include a clutch or clutch system 208 that allows the transmissions 110 to disengage from the electric motor 112, thereby allowing the electric motor 112 to start under no (or a reduced) load. Additionally, and/or alternatively, the transmissions 110 may include a clutch 208 allowing the transmissions 110 to disengage and engage the pumps 108. In some examples, the clutch 208 is mechanically coupled to the transmission 110.

In some examples, the transmissions 110 may include transmission speed sensors 204(1) and 204(2) (collectively "the transmission speed sensors 204"). The transmission speed sensors 204 may be communicatively coupled to a controller such as one of the one or more controllers 132 as described in FIG. 1. Additionally, and/or alternatively, the transmission speed sensors 204 may be communicatively coupled to another controller dedicated to the control of the transmissions 110 of the pump system 104. The transmission speed sensors 204 may determine the actual gear ratio, or other parameters, of the transmissions 110 while the transmissions 110 are in use. For example, the transmission speed sensors 204 may determine a rotational speed of an input shaft such as shaft 202 and determine a rotational speed of output shafts 206. From the transmission speed sensors 204, the controller(s) 132 may determine the actual gear ratios, or other parameters, of the transmissions 110. Additionally, and/or alternatively, the transmission speed sensors 204 may determine a speed ratio of the transmissions 110. As mentioned previously, the transmissions 110 may include output shafts 206. For example, the first transmission 110(1) may include a first output shaft 206(1) coupled to a first pump 108(1) and the second transmission may include a second output shaft 206(2) coupled to a second pump 108(2).

In some examples, each trailer 106 may provide a predetermined amount of power (horsepower) to the hydraulic fracturing system 100 in order to complete the hydraulic fracturing process. The design of each trailer 106 may be determined based on the power requirements for each trailer 106. For example, a trailer 106 may need to provide approximately 5000 HP to the hydraulic fracturing system 100. Following such an example, in the configuration shown in FIG. 2, each pump 108 may include a 2500 HP pump, thereby reducing the power requirements for the pumps 108. Thus, the configuration shown in FIG. 2 may reduce the horsepower requirements for individual pumps 108 since the electric motor 112 may drive multiple pumps 108.

Figure 3:
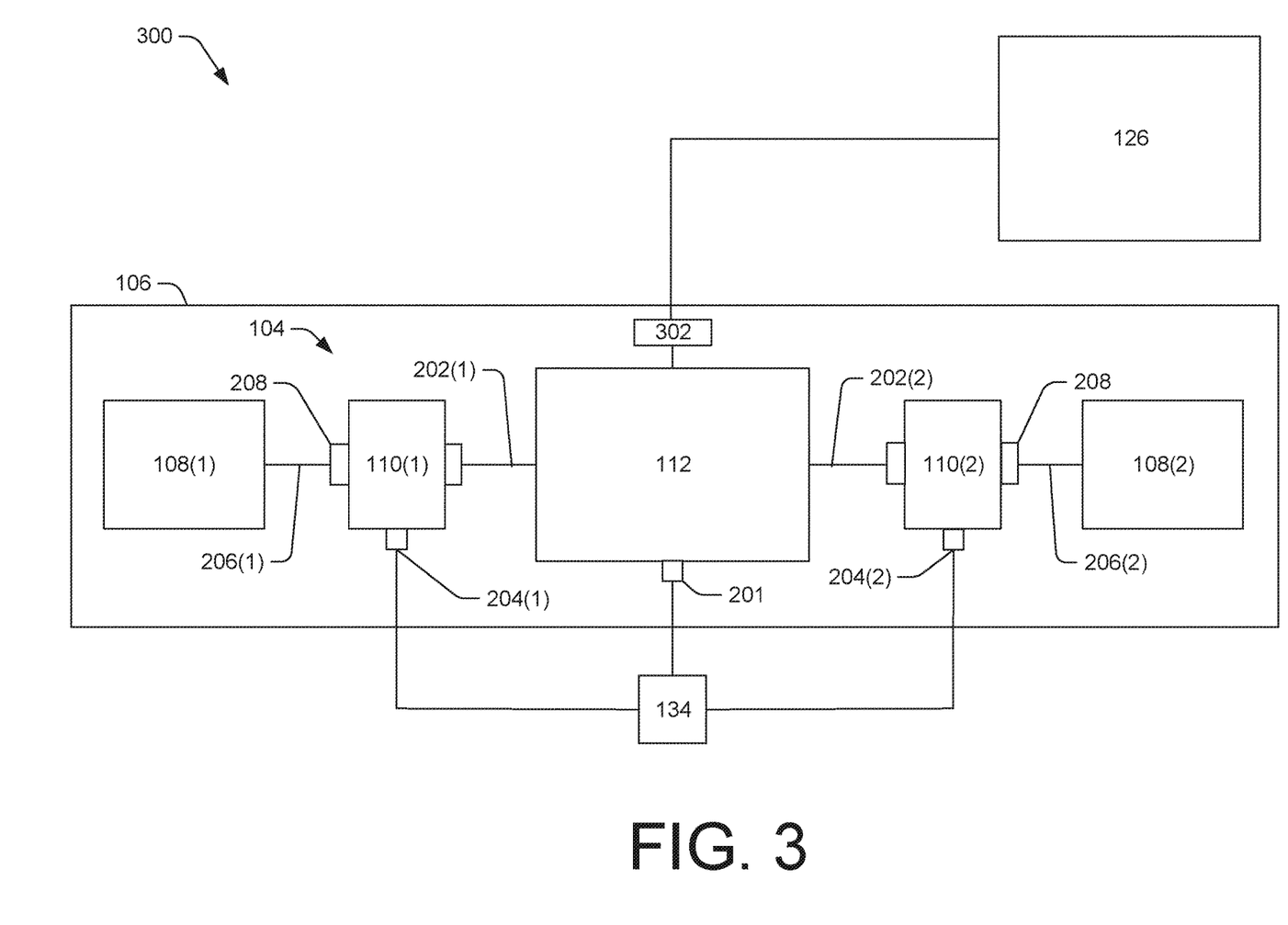
FIG. 3 is a schematic illustration of a second configuration of a fluid pump system in accordance with an example of the present disclosure.

FIG. 3 depicts a schematic illustration of a second configuration 300 of a fluid pump system 104. In some examples, the second configuration 300 of the fluid pump system 104 may be substantially similar to the first configuration 200 of the fluid pump system 104. However, in the second configuration 300, the relay may be omitted. Instead, the pump system 104 shown in FIG. 3 may include a dedicated starter (or other type of motor controller) 302 that is electrically connected to the power source 126. In such an example, the starter 302 is configured to start the electric motor 112. Any appropriate type of starter 302 may be used to control startup of the electric motor 112. For example, the starter 302 may include any type of starter such as manual starters, soft starters, self-starters, or magnetic motor starters including direct on-line starters, rotor resistance starters, auto transformer starters, etc. The controller 132 may be communicatively coupled to the starter 302 and may cause the starter 302 to start and stop the electric motor 112. For example, the controller 132 may send a signal to the starter 302 causing a contactor of the starter to make or break a circuit of the starter, thereby causing power to flow or cease from flowing to the electric motor 112 from the power source 126. As described above, the starter 302 may gradually increase and decrease the current supplied to the electric motor 112 in order to start and stop the electric motor 112 gradually.

The transmissions 110 may include a clutch 208 that allows the transmissions 110 to disengage from the electric motor 112, thereby allowing the electric motor 112 to start under no (or reduced) load. Additionally, and/or alternatively, the transmissions 110 may include a clutch 208 allowing the transmissions 110 to disengage and engage the pumps 108. As mentioned previously, the electric motor 112 may be configured to operate at a constant speed and the transmissions 110 may provide varying speed and torque output for the pumps 108. For example, the controller 132 may adjust a gear ratio of the transmissions 110 in order to adjust a pump 108 pressure and flow rate. Thus, the configuration 300 shown in FIG. 3 may eliminate the need for a motor controller to control the speed of the electric motor 112 during a hydraulic fracturing process. Additionally, and/or alternatively, since the electric motor 112 may operate at a same voltage as the power source 126, the configuration 300 shown in FIG. 3 may eliminate the need for transformers to reduce voltage supplied by a power source to an electric motor.

Figure 4:
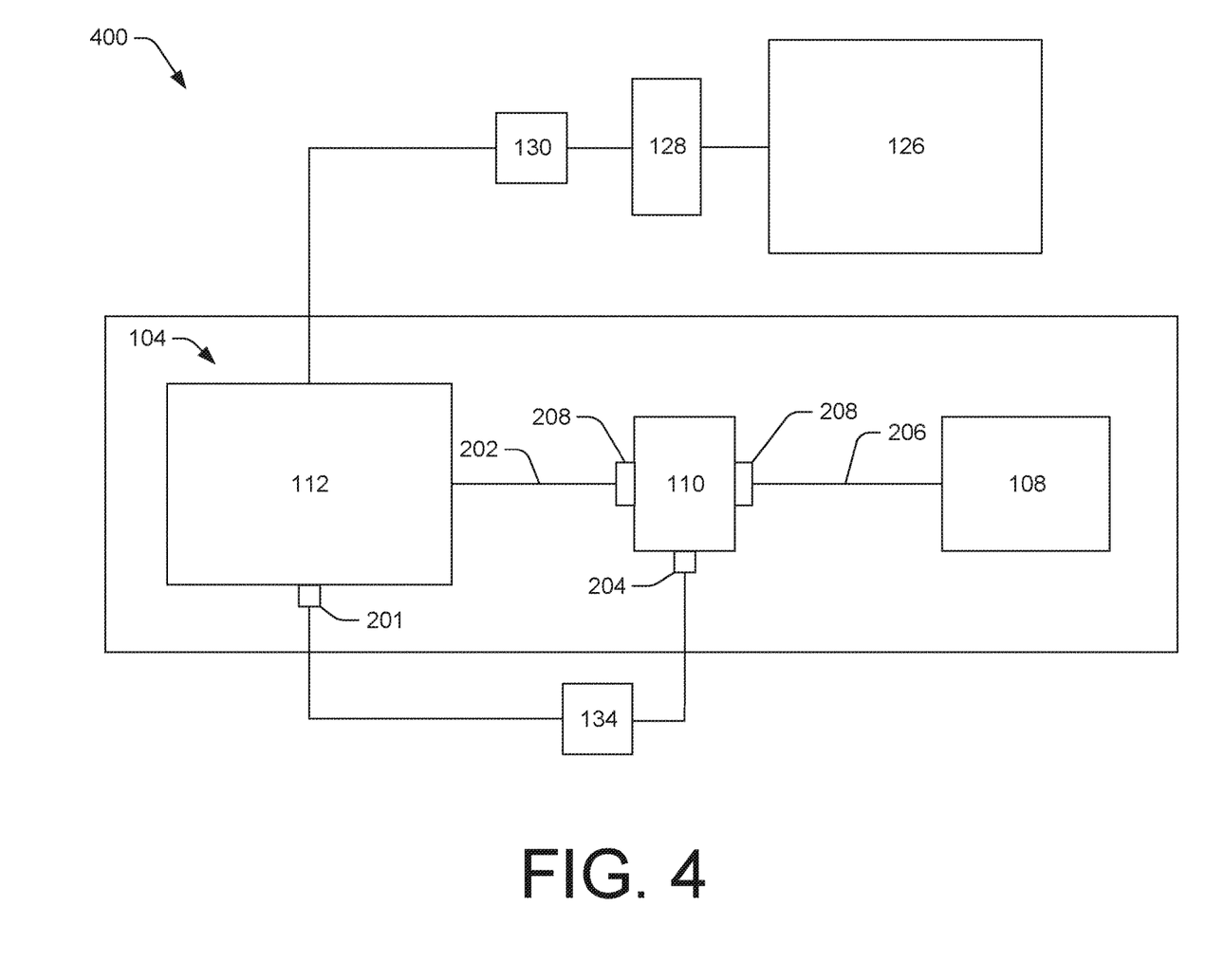
FIG. 4 is a schematic illustration of a third configuration of a fluid pump system in accordance with an example of the present disclosure.

FIG. 4 depicts a schematic illustration of a third configuration 400 of a fluid pump system 104. In some examples, the third configuration 400 may include a single pump 108 that is powered by an electric motor 112. The pump system 104 shown in the third configuration 400 includes a transmission 110 coupled to the electric motor 112 via a drive shaft 202 of the electric motor 112. The transmission 110 receives the drive shaft 202 of the electric motor 112 rotating at a first speed and transfers the rotational energy of the drive shaft via an output shaft 206 of the transmission 110. The output shaft 206 may rotate at a second speed depending on a gear ratio (or speed ratio) of the transmission 110. In some examples, the pump system 104 may include one or more clutches 208 (referred to herein as "a clutch 208"). The clutch 208 may be configured to engage and disengage the transmission 110 from the electric motor 112 and/or the pump 108. The clutch 208 may allow the electric motor 112 to be started under no load (i.e., while disconnected form the transmission 110 and/or the pump 108) and may be configured to engage the transmission 110 once the electric motor 112 reaches a predetermined speed. Additionally, the clutch 208 may be configured to engage and disengage the transmission 110 for various additional operations. In some examples, the controller 132 may be configured to engage and disengage the clutch 208.

The third configuration 400 shown in FIG. 4 may depict a configuration where a single, high horsepower pump is used. For example, the pump 108 may include a 5000 HP pump. However, the pump 108 shown in FIG. 4 is not limited to a 5000 HP pump and the pump 108 may be of varying sizes depending on the particular pump design. The third configuration 400 having a single pump 108 may reduce the number of pumps needed in a hydraulic fracturing system 100. In some examples, the pump system 104 shown in FIG. 4 may include a motor controller 128 that may be electrically connected to the electric motor 112 via a relay 130, similar to the first configuration 200 shown in FIG. 2. Alternatively, the single pump configuration shown in FIG. 4 may include a dedicated motor controller (such as a line starter or the like) similar to the second configuration 300 shown in FIG. 2. As mentioned previously, the electric motor 112 may be configured to operate at a constant speed and the transmissions 110 may provide varying speed and torque output for the pumps 108. For example, the controller 132 may adjust a gear ratio (or speed ratio) of the transmissions 110 in order to adjust a pump 108 pressure and flow rate. Thus, the configuration 400 shown in FIG. 4 may eliminate the need for a motor controller to control the speed of the electric motor 112 during a hydraulic fracturing process. Additionally, and/or alternatively, since the electric motor 112 may operate at a same voltage as the power source 126, the configuration 400 shown in FIG. 4 may eliminate the need for transformers to reduce voltage supplied by a power source to an electric motor. Furthermore, the third configuration 400 may include a single pump and may, therefore, reduce a total number of pumps needed in a hydraulic fracturing system 100. It is to be understood that various additional configurations are within the scope of the present disclosure that are not shown in FIGS. 2-4. FIGS. 2-4 are not to be seen as limiting, rather FIGS. 2-4 give a few possible configurations of a constant speed electric motor 112 that drives one or more pumps 108 via one or more transmissions 110.

Figure 5:
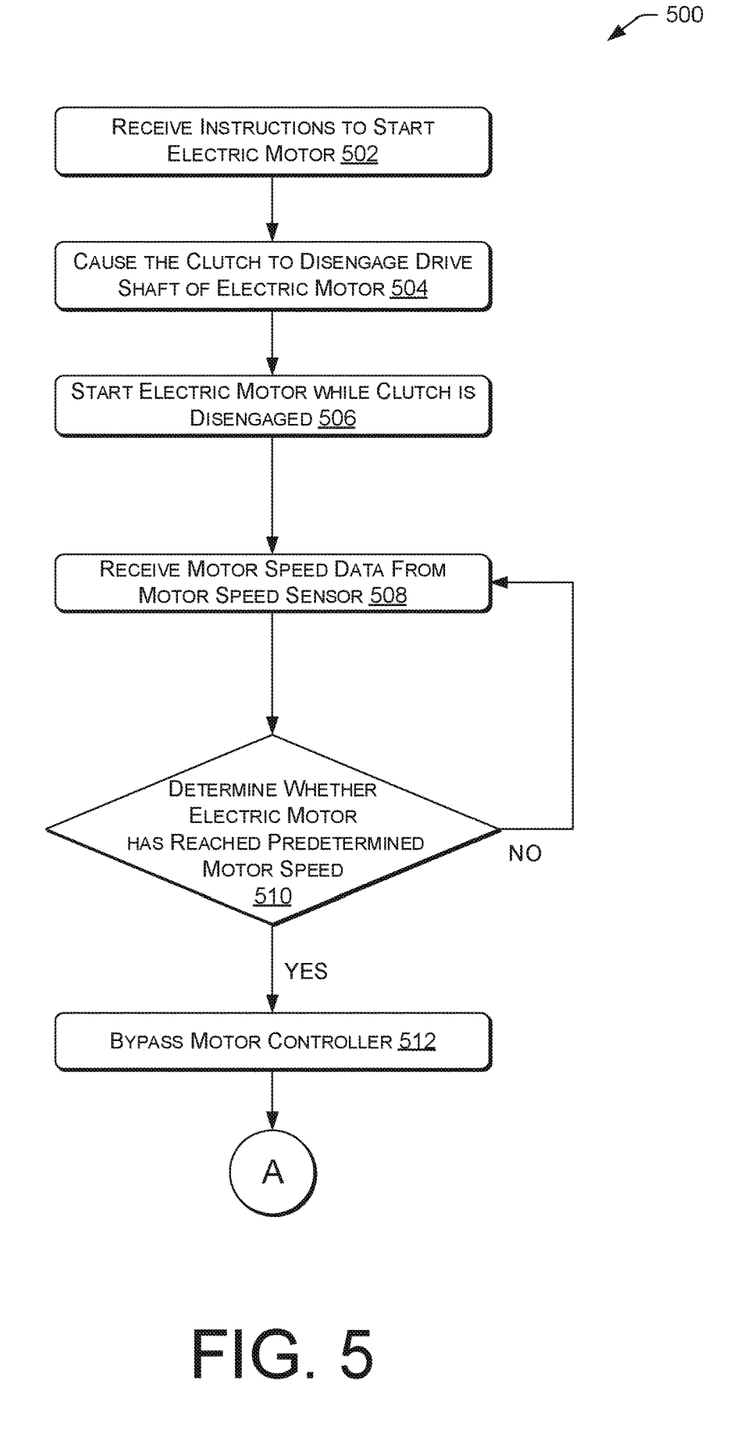
FIGS. 5-6 collectively illustrate a flowchart of an example method of driving an electronic motor to power a fluid pump system in accordance with an example of the present disclosure.
Figure 6:
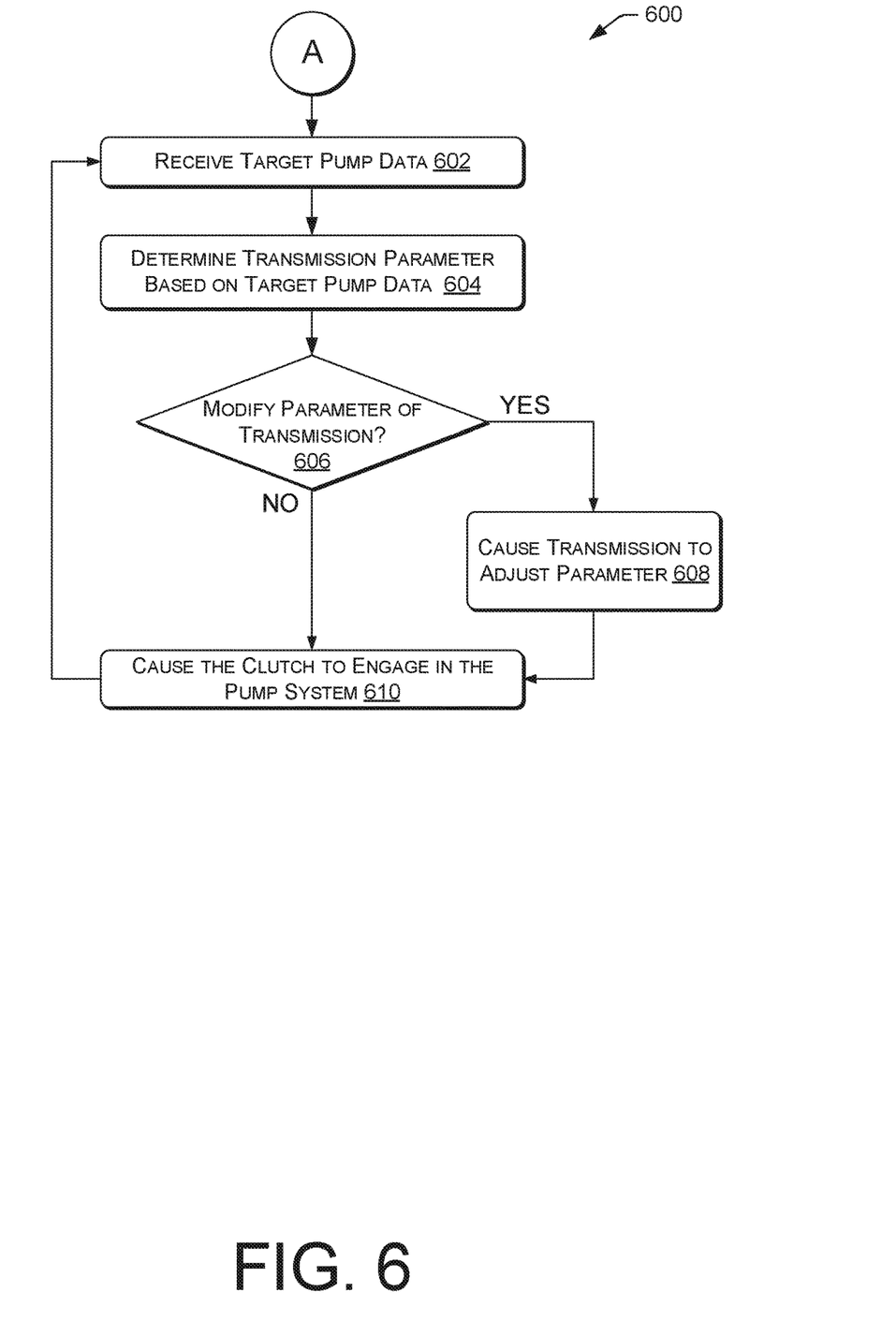

FIGS. 5-6 collectively illustrate an exemplary method 500 for driving an electric motor 112 to power a pump system 104. The example method is illustrated as a collection of steps in a logical flow diagram, which represents operations that may be implemented in hardware, software, or a combination thereof. In the context of software, the steps represent computer-executable instructions stored in memory. Such computer-executable instructions may include routines, programs, objects, components, data structures, and the like that perform particular functions or implement particular abstract data types. The order in which the operations are described is not intended to be construed as a limitation, and any number of the described steps may be combined in any order and/or in parallel to implement the process. For discussion purposes, and unless otherwise specified, the method 500 is described with reference to the hydraulic fracturing system 100, the pump system 104, and the controller 132. In particular, and unless otherwise specified, the method 500 will be described below with respect to the controller 132 for ease of description. Additionally, and/or alternatively, at least a portion of the method 500 may be performed by user input via one or more user interfaces in the data monitoring van 134 and/or via user interfaces included on various components of the hydraulic fracturing system 100.

With reference to FIG. 5, at 502, the controller 132 receives instructions to start the electric motor 112. In some examples, a user may provide user input via a switch, user interface, or other selectable control that provides instructions to the controller 132 to start the electric motor 112. Additionally, and/or alternatively, the controller 132 may receive instructions to start the electric motor 112 from a computing device that is configured to control at least a portion of a hydraulic fracturing process.

At 504, in response to receiving the instructions to start the electric motor, the controller 132 causes the clutch 208 to disengage the drive shaft 206 of the electric motor 112. Additionally, and/or alternatively, the controller 132 may cause the clutch 208 to disengage the pump 108. In some examples, causing the clutch 208 to disengage the drive shaft 206 of the electric motor 112 and/or to disengage the pump 108 may enable the electric motor 112 to start under no load (or under a reduced load). In some examples, the controller 132 may be communicatively coupled to an electronic control module (ECM) or other controller of the transmission 110 and/or clutch 208 and may provide instructions to the ECM to disengage and/or engage the clutch 208.

At 506, the controller 132 starts the electric motor 112 while the clutch 208 is disengaged from a drive shaft 206 of the electric motor 112. In some examples, a motor controller 128, such as a VFD, starter 302, or other motor controller, may control the start up of the electric motor 112. For example, the motor controller 128 may adjust the frequency of a current supplied to the electric motor 112 until a frequency of the electric motor 112 synchronizes with a frequency of a power source 126 and the electric motor 112 reaches a constant and predetermined speed (e.g., 1800 RPM). In some examples, the controller 132 may instruct the motor controller 128 to start the electric motor 112.

At 508, the controller 132 receives motor speed data from the motor speed sensor 201 of the electric motor 112. In some examples, the motor speed data represents a rotational speed of the shaft 202 of the electric motor 112 and may be represented in revolutions per minute (RPM). At 510, the controller 132 determines whether the electric motor 112 has reached a predetermined motor speed based at least in part on the motor speed data received from the motor speed sensor 201. In some examples, the electric motor 112 may be configured to operate at the predetermined speed. Additionally, and/or alternatively, a user may specify, via the controller 132, the predetermined speed. In some examples, the electric motor 112 may receive data from the motor controller 128 indicating that the electric motor has been synchronized with the supply current of the power source 126 (i.e., the frequency of current of the electric motor 112 is synchronized with the frequency of a supply current supplied by the power source 126) and is therefore operating at a predetermined speed.

If the controller 132 determines at 510 that the motor speed has not reached the predetermined motor speed, the method 500 returns to 508 where the controller 132 continues to receive motor speed data from the motor speed sensor 201. If, however, the controller 132 determines at 510 that the motor speed has reached the predetermined motor speed, the method 500 proceeds to 512 where the controller 132 bypasses the motor controller 128 via the relay 130. For example, the controller 132 may, via the relay 130, turn on and/or off one or more contacts of the relay 130 in order to disconnect the motor controller from the electric motor 112. Furthermore, the controller 132 may, via the relay 130 (or another relay), turn on and/or off one or more contacts of the relay in order to connect the electric motor 112 directly to the power source 126. As mentioned previously, the electric motor 112 may be configured to operate at a same voltage and/or frequency as the power source 126. Thus, the use of transformers may be reduced and/or eliminated.

The flow diagram 600 continues the illustration of the method. At 602, the controller 132 receives target pump data. The target pump data may include a target flow rate and/or a target pressure at which the pump 108 (or pumps) is to operate. The target flow rate represents a target amount of fracturing fluid (or other fluid) that the pump 108 is required to pump into a well 102. The target flow rate may be represented in gallons per minute (GPM), liters per minute (LPM), barrels per minute, or any other volume of fluid per time unit. The target pressure represents a pressure at which the pump 108 injects the fracturing fluid into the well 102. The target pressure may be represented in pounds per square inch (psi), pascals (Pa), or any other measure of pressure. In some examples, the target flow rate may define a target flow rate (or flow rate range) for various stages of a hydraulic fracturing (or other pumping) process. The target pressure may define a target pressure (or target pressure range) for various stages of the hydraulic fracturing process. The controller 132 may receive the target flow rate and/or target pressure from another controller, one or more computing systems, or other control system. The target flow rate and/or pressure data may be determined by a user and/or one or more computing programs. The target flow rate and/or target pressure may specify a target flow rate and/or pressure range at which each pump 108 in the hydraulic fracturing system 100 is to operate at during various stages of a hydraulic fracturing process.

At 604, the controller 132 determines a transmission 110 parameter, such as a gear ratio, speed ratio, or other transmission parameter, based on the target pump data. In examples, where the transmission 110 includes a CVT, the controller 132 determines a speed ratio at 604. The controller 132 may determine a parameter for the transmission 110 necessary for the pump system 104 to output the target flow rate and/or target pressure specified at 602. In some examples, the pump 108 output (flow rate and/or pressure) may be directly dependent upon the gear ratio or speed ratio of the transmission 110. The controller 132 may rely on one or more data maps, look-up tables, algorithms, etc. to determine the transmission 110 gear ratio based on the target pump data. Additionally, and/or alternatively, the controller 132 determines a speed and/or torque output of the transmission 110 necessary to achieve the target flow rate and/or target pressure at the pump 108. The speed and torque output of the transmission 110 may depend on a gear ratio or a speed ratio in the case of a CVT transmission.

At 606, the controller 132 determines whether to modify the parameter (e.g., gear ratio or speed ratio) of the transmission 110. For example, the controller 132 determines whether to modify the gear ratio (or speed ratio) of the transmission 110 based on a current position of the transmission 110. If the controller 132 determines that the parameter of the transmission 10 needs to be modified, the controller 132 causes the transmission 110 to adjust the parameter of the transmission 110 at 608. For example, the controller 132 causes the transmission 110 to change gears. Alternatively, if the transmission 110 includes a CVT, the controller 132 may adjust a position of one or more components of the transmission in order to change the speed ratio of the CVT. In such an example, the transmission 110 may remain engaged with the electric motor 112 and the pump 108 while the speed ratio of the transmission 110 is adjusted. Additionally, and/or alternatively, the transmission 110 may be disengaged from the electric motor 112 and/or the pump 108 while the gear ratio of the transmission is adjusted and may be reengaged once the gear ratio adjustment is completed. In some examples, the electric motor 112 may be configured to maintain a constant speed through adjustments of the gear ratio. Thereby, the need for power electronics such as motor controllers may be reduced and/or eliminated once the electric motor 112 has been started and synchronized. Thus, a single motor controller may be used to control the startup of multiple electric motors and may be bypassed once an electric motor has been started and synchronized. Once the controller 132 has adjusted the parameter of the transmission 110, the method 600 proceeds to 610.

However, if the controller 132 determines at 606 to not modify a parameter of the transmission 110, the method 600 continues to 610 where the controller 132 causes the clutch 208 to engage in the pump system 104. As mentioned previously, the pump system 104 may include a clutch 208 between the electric motor 112 and the transmission 110 and/or between the transmission 110 and the pump 108. As such, causing the clutch 208 to engage in the pump system 104 may cause the clutch 208 to connect the drive shaft 202 to the transmission 110 via the clutch 208. Additionally, and/or alternatively, causing the clutch 208 to engage in the pump system 104 may cause the clutch 208 to connect the output shaft 206 of the transmission to the pump 108. Once the clutch 208 has engaged in the pump system 104, the method 600 may return to 602 where the controller 132 receives target pump data. In some examples where the transmission 110 includes a CVT, the clutch 208 may remain engaged while the speed ratio of the CVT is adjusted based on the target pump data received by the controller 132.

INDUSTRIAL APPLICABILITY

The present disclosure describes a pump system 104 in a hydraulic fracturing system 100 (or other fluid pump system) that eliminates the need for dedicated power electronics to control electric motors 112 and eliminates the need for transformers to reduce the voltage of a supply current from a power source 126 to an electric motor 112. The pump system 104 includes an electric motor 112 configured to operate at a constant speed and to operate at a same voltage and/or frequency as a power source 126. The electric motor 112 is mechanically coupled to one or more transmissions 110 that transfer rotational energy of the electric motor 112 at an adjusted speed and torque. The one or more transmissions 110 transfer the rotational energy of the electric motor 112 to one or more pumps 108.

As a result of the configurations described herein, the electric motor 112 is configured to operate at a constant speed, thereby eliminating the necessity of a dedicated motor controller 128 (such as a VFD or other motor controller) for each electric motor 112. As described previously, instead of varying the speed of the electric motor 112 during a hydraulic fracturing process, the pump system 104 adjusts a position of the transmission 110 during the hydraulic fracturing process. Reducing the amount of motor controllers used in a hydraulic fracturing system 100 may significantly reduce cost of the hydraulic fracturing system 100. Furthermore, since the electric motor 112 is configured to operate at a relatively high voltage, the use of transformers may not be necessary, thereby reducing complexity and/or cost of the hydraulic fracturing system 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for driving a pump, the system comprising:
   a dual speed electric motor having a drive shaft configured to rotate at a first constant speed or a second constant speed;
   a power source electrically connected to the electric motor and operative to drive the electric motor;
   an electronic motor controller operably connected to the electric motor via an electronic relay, wherein:
      the motor controller is operably connected to the electric motor by the electronic relay to start the electric motor, and is operably disconnected from the electric motor by the electronic relay once the drive shaft reaches the first constant speed and the second constant speed, and
      the electronic motor controller is operably connected to the electric motor via the relay to selectively adjust a speed of the electric motor between the first constant speed and the second constant speed, wherein a first number of poles of the electronic motor are used to drive the electronic motor at the first speed and a second number of poles of the electronic motor are used to drive the electronic motor at a second speed; and
   a pump coupled to the drive shaft via a transmission, wherein the transmission is configured to transfer rotational energy from the drive shaft to the pump via an output shaft of the transmission, the output shaft of the transmission being configured to drive the pump at varying speeds while the drive shaft rotates at the constant speed.

2. The system according to claim 1, wherein the pump includes a first pump coupled to a first end of the drive shaft and the system includes a second pump coupled to a second end of the drive shaft.

3. The system according to claim 1, wherein the electric motor operates at a same voltage as the power source.

4. The system according to claim 1, wherein the electronic motor controller is electrically connected to a plurality of electric motors via the electronic relay and is bypassed once individual electric motors of the plurality of electric motors are started and synchronized.

5. The system according to claim 1, wherein the pump includes a hydraulic fracturing pump configured to pump fracturing fluid into a wellbore.

6. The system according to claim 1, wherein the transmission includes a continuously variable transmission.

7. The system according to claim 1, wherein adjusting a gear ratio or a speed ratio of the transmission results in an at least one of an adjusted pump flow rate or pump pressure of the pump.

8. An electric drive system comprising:
   an electrical power source;
   a dual speed electric motor electrically connected to the power source and configured to operate at a same voltage or frequency as the electrical power source, the electric motor having a drive shaft configured to rotate at a first constant speed and a second constant speed;
   an electronic motor controller operably connected to the electric motor via an electronic relay, wherein:
      the electronic motor controller is operably connected to the electric motor by the electronic relay to start the electric motor, and is operably disconnected from the electric motor by the electronic relay once the drive shaft reaches the first constant speed, and
      the electronic motor controller is operably connected to the electric motor via the relay to selectively adjust a speed of the electric motor between the first constant speed and second constant speed, wherein a first number of poles of the electronic motor are used to drive the electronic motor at the first speed and a second number of poles of the electronic motor are used to drive the electronic motor at a second speed; and
   a pump coupled to the drive shaft of the electric motor via a transmission, wherein a gear ratio or speed ratio of the transmission is selected to adjust at least one of a flow rate or a pump pressure of the pump.

9. The electric drive system according to claim 8, wherein the pump includes a hydraulic fracturing pump configured to pump fracturing fluid into a wellbore.

10. The electric drive system according to claim 8, wherein the electronic motor controller includes a variable frequency drive electrically coupled to the electric motor, wherein the variable frequency drive is configured to start the electric motor.

11. The electric drive system according to claim 10, wherein the variable frequency drive is electrically coupled to a plurality of electric motors via the relay and the variable frequency drive is bypassed once individual electric motors of the plurality of electric motors are started and synchronized.

12. The electric drive system according to claim 10, wherein the variable frequency drive is remote from the electric motor.

13. The electric drive system according to claim 8, wherein the transmission is configured to transfer rotational energy from the drive shaft rotating at a first speed to the pump via an output shaft of the transmission rotating at a second speed.

14. The electric drive system of claim 8, wherein the pump is a first pump and the drive shaft of the electric motor includes a first end coupled to the first pump and a second end coupled to a second pump, wherein the electric motor is configured to drive the first pump and the second pump simultaneously via the drive shaft.

15. A method of driving a pump, the method comprising:
receiving, via a controller, instructions to start a first electric motor, the first electric motor comprising a dual speed electric motor having a drive shaft configured to rotate at a first constant speed or a second constant speed;
starting, via a variable frequency drive and a power source, the first electric motor, wherein the variable frequency drive controls a frequency and voltage of power that is supplied to the first electric motor until a frequency of the first electric motor is synchronized with a frequency of power that is supplied by the power source;
receiving, from one or more sensors and by the controller, motor speed data indicative of a motor speed of the first electric motor;
determining, via the controller, that the motor speed has reached the first constant speed;
bypassing, via the controller and an electronic relay, the variable frequency drive based at least in part on determining that the motor speed has reached the first constant speed, wherein bypassing the variable frequency drive includes electrically connecting the electric motor directly to the power source;
connecting, via the controller and the electronic relay, the variable frequency drive to a second electric motor to start the second electric motor;
connecting, via the controller and the electronic relay, the variable frequency to drive to the first electric motor; and
adjusting, via the variable frequency drive, the motor speed of the first electric motor from the first constant speed to the second constant speed, wherein adjusting the motor speed includes changing a number of poles configured to drive the drive shaft of the first electric motor.

16. The method according to claim 15, further comprising:
receiving, via the controller, target pump data indicating at least one of a target flow rate or a target pressure at which to operate the pump; and
determining, via the controller, a transmission gear ratio or speed ratio based at least in part on the target pump data.

17. The method according to claim 16, further comprising:
causing, via the controller, the transmission to adjust the gear ratio or the speed ratio, wherein the gear ratio or the speed ratio is selected in order to control at least one of a pump flow rate or a pump pressure.

18. The method according to claim 16, further comprising causing, via the controller, a clutch to engage the pump, wherein the clutch is mechanically coupled to the transmission.

19. The method according to claim 15, wherein the variable frequency drive is selectively connected to a plurality of electric motors via the electronic relay.

20. The method according to claim 15, the pump includes a well service pump configured to pump fluid into a wellbore.

* * * * *